3,005,755
AQUEOUS SOLUTIONS OF QUINIDINE SALTS AND NICOTINAMIDE
Karl Schoen, Kew Gardens, N.Y., assignor to Endo Laboratories Inc., New York, N.Y., a corporation of New York
No Drawing. Filed Mar. 30, 1956, Ser. No. 574,942
4 Claims. (Cl. 167—67)

This invention relates to quinidine; and, in particular, is directed to enhancing the solubility of quinidine in water.

Quinidine is a dextro rotatory stereoisomer of quinine and is used principally in certain cases of heart diseases such as auricular fibrillation. Most of the known salts of quinidine are only sparingly or moderately soluble in water. To administer the usual dose of 200 milligrams of quinidine, or more, by the injection route, it has been the practice to administer relatively large volumes of the aqueous solution thereof or to utilize non-aqueous solvents for the drug, such as propylene glycol, and the like. The latter, however, often causes undesirable side effects on the tissues and give rise to pain.

One of the most readily soluble salts of quinidine is the gluconate which dissolves in nine times its volume of water at room temperature yielding a solution which is equivalent to approximately 60 milligrams of the quinidine alkaloid in 1 ml. of solution. Other soluble salts of quinidine with glutamic and aspartic acid are described in German Patent No. 637,261.

In carrying out the investigations which led to the instant invention, the objective of the investigation being to discover how to prepare stable aqueous solutions close to the neutral point in pH and containing 250 mg. of quinidine alkaloid in a volume of 2 ml. or even less, I discovered that surprisingly, nicotinamide exerted a remarkable solubilizing action on quinidine salts.

I discovered that quinidine sulphate, which has a solubility of but 1.1% in water at 25° C., can be increased in solubility to provide a stable 16% solution if it is dissolved together with an equal amount by weight of nicotinamide. Quinidine gluconate, which normally is soluble in water only to the extent of 11%, has its solubility enhanced to provide a 25% stable solution thereof when it is dissolved together with one-half of its own weight of nicotinamide. I also discovered that the salt of quinidine with theophylline-7-acetic acid, in the presence of an equal quantity of nicotinamide, forms a 25% solution in water.

These solutions are characterized by properties which make them especially desirable for the preparation of ampule solutions used for injection. These solutions have a pH of between 6 and 7, a figure close to the neutral point, as a result of which they are well tolerated both on intravenous and intramuscular application. The solutions are stable to heat and can be autoclaved. Moreover, the stability extends over great lengths of time; and the solutions are free from precipitations when stored either at room temperature or under refrigeration. But one precaution must be taken to preserve the stability. They should be kept away from the light since quinidine solutions exhibit discoloration when exposed to light for long periods of time.

After I had discovered that nicotinamide is a selective, solubilizing agent for quinidine salts, I continued my investigations and made the further discovery that nicotinic acid, itself, forms a salt with quinidine which is exceedingly soluble in water. This newly discovered salt, quinidine nicotinate, forms stable aqueous solutions in concentrations up to 45% corresponding to more than 325 mg. of quinidine base in a volume of 1 ml.

Quinidine nicotinate is thus the most soluble salt of quinidine so far known or reported.

The exceptional water solubility of the nicotinic acid salt of quinidine is also exhibited, although to a lesser degree, by the salts of the two isomeric pyridine carboxylic acids, i.e., isonicotinic acid (pyridine-4-carboxylic acid) and picolinic acid (pyridine-2-carboxylic acid). Quinidine isonicotinate forms saturated solutions in water containing about 38% of the salt. Quinidine picolinate dissolves to the extent of approximately 9% in water. An important feature of these newly discovered salts of quinidine with nicotinic and isonicotinic acid resides in that high concentrations of quinidine alkaloid can be effectuated in aqueous, practically neutral solution, without use of auxiliary solubilizing agent as described above by using nicotinamide. As a result of this aspect of the discovery, concentrated solutions are made available, which contain a relatively low percentage of solids with relation to quinidine. That feature is especially advantageous for the preparation of solutions administered by injection. A further advantage of these novel salts resides in the favorable pharmacologic influence of the acid moiety upon the quinidine alkaloid.

Accordingly, it is among the principal objects of this invention to provide means for enhancing the solubility of quinidine in water; and also to provide novel aqueous solutions of quinidine in high concentration.

Another object of this invention is to provide aqueous solutions of quinidine in high concentration wherein an enhanced solubility of the quinidine results from the presence in the solution of an acyl radical of a pyridine-carboxylic acid, especially the pyridine-3 and pyridine-4 carboxylic acids, either as added components in the form, for example, of amides or salts thereof, or as the acyl moiety of quinidine salts of said carboxylic acids.

A further object of this invention is to provide novel compounds of quinidine possessing great solubility in water.

A still further object of this invention is to provide as novel compounds of quinidine, the pyridine carboxylic acid salts of quinidine, of which the nicotinate and the isonicotinate are exceptionally soluble in water.

The following are illustrative examples in accordance with this invention.

EXAMPLE 1

*Solubilizing of quinidine sulphate*

20 grams of quinidine sulphate and 20 grams of nicotinamide were dissolved in water to produce a total volume of 100 ml. The resulting clear solution was filtered and filled into 2 ml. ampules which were sealed and autoclaved at 15 lbs. pressure for 20 minutes.

A stable solution resulted, each 1 ml. of which contains 160 mg. of quinidine alkaloid.

EXAMPLE 2

*Solubilization of quinidine gluconate*

18 grams of quinidine and 9.9 grams of gluconodeltalactone were heated with 100 ml. of water on a steam bath until the greater part of the quinidine was dissolved. 8 grams of nicontinamide and enough water was added to make a total volume of 150 ml. To the clear solution there was added 150 mg. of sodium bisulphite, the solution was filtered and filled into 2 ml. ampules which were sealed and sterilized by heating in an autoclave at 15 lbs. pressure for 20 minutes. A clear, stable solution resulted, each 1 ml. of which contained 125 mg. of quinidine alkaloid.

EXAMPLE 3

*Solubilization of quinidine theophylline-7-acetate*

11 grams of theophylline-7-acetic acid salt of quinidine (57.67% of the base), and 6 grams of nicotinamide were dissolved in enough distilled water to give a volume of 50 ml. After filtration, filled into ampules and autoclaved, a solution was obtained, each 1 ml. of which contained 125 mg. of quinidine. The pH of the solution was 6.3.

EXAMPLE 4

*Quinidine nicotinate*

32.44 grams of quinidine (0.1 mol) and 12.31 grams nicotinic acid (0.1 mol) were dissolved in 100 ml. of water and the resulting solution evaporated to dryness. The dry residue was placed in an oven at a temperature of 105°–120° C. for 24 hours. A glassy, slightly yellow material was obtained. It was hygroscopic. It sintered at 60° C. and melted at 66–69° C. to a clear liquid. The salt is very soluble in water and alcohol. A 10% aqueous solution of the salt has a pH of 6.3 and an optical rotation of $[\alpha]_D$ 139.1°. Even after prolonged drying, the salt tenaciously retains 1 molecule of water of crystallization.

Assay: $C_{20}H_{24}N_2O_2.C_6H_5NO_2.H_2O$ — Mol. weight 465.54. Quinidine content: Calc. 69.68%. Found 68.25%.

EXAMPLE 5

*Quinidine isonicotinate*

Quinidine and isonicotinic acid, in equimolar amounts, were dissolved in water; the solution evaporated to dryness; and the residue further dried in an oven at 105°–110° C. for 24 hours. Upon cooling, a yellow material was obtained which was not quite as hygroscopic as the nicotinic acid salt. Upon rapid heating, quinidine isonicotinate softens at 80° C., sinters at 96° C. and melts at 115° C. to a turbid liquid. When heated very slowly, the melting point is 162°–165° C.

Assay: $C_{20}H_{25}N_2O_2.C_6H_5NO_2.H_2O$ — Mol. weight 465.54. Quinidine content: Calc. 69.68%. Found 69.30%.

Quinidine isonicotinate dissolves in water to a concentration of about 38% thus allowing for the preparation of stable solutions of the salt containing 250 mg. of quinidine alkaloid per ml. A 10% aqueous solution of this salt has a pH of 6.5 and an optical rotation of $[\alpha]_D$ 138.3°.

EXAMPLE 6

*Quinidine picolinate*

32.44 grams of quinidine and 12.31 grams of picolinic acid were dissolved in 120 ml. of boiling water. Upon cooling, and standing for several days at room temperature, quinidine picolinate crystallized in almost colorless, large crystals which melt at 70°–72° C. and contain water of crystallization. When these crystals are heated over potassium hydroxide, in vacuuo, at 65° C., they gradually lose their water of crystallization and are transformed into a glassy mass which melts at 88°–95° C.

Another crystal modification was obtained in one of the experiments of this investigation which had a melting point of 144°–146° C.

Assay: $C_{20}H_{24}N_2O_2.C_6H_5NO_2$—Mol. weight 447.52. Quinidine content: Calc. 72.50%. Found 74.18%.

At 25° C., quinidine picolinate forms saturated solutions in water having a concentration of the salt in the amount of 8.86%. The salt readily forms super-saturated solutions in concentrations up to 28% which are stable for several days.

It will be understood that the foregoing description of the invention and the examples set forth are merely illustrative of the principles thereof. Accordingly, the appended claims are to be construed as defining inventions within the full spirit and scope thereof.

I claim:
1. Aqueous solutions of quinidine which comprise a salt of quinidine and nicotinamide.
2. Aqueous solutions of quinidine which comprise quinidine sulphate, nicotinamide and water.
3. Aqueous solutions of quinidine which comprise quinidine gluconate, nicotinamide and water.
4. Aqueous solutions of quinidine which comprise quinidine salt of theophylline-7-acetic acid, nicotinamide and water.

References Cited in the file of this patent

UNITED STATES PATENTS 2,230,631    Thomas et al. ----------   Feb. 4, 1941

OTHER REFERENCES

Quinidine in Disorders of the Heart, Gold, Paul B. Hoche, Inc., pp. 94–98, Feb. 17, 1950.